UNITED STATES PATENT OFFICE.

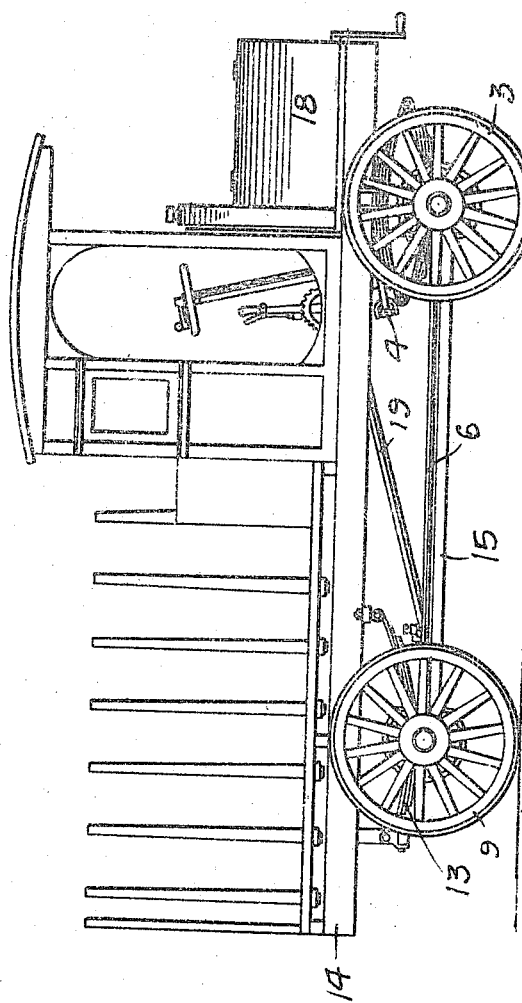

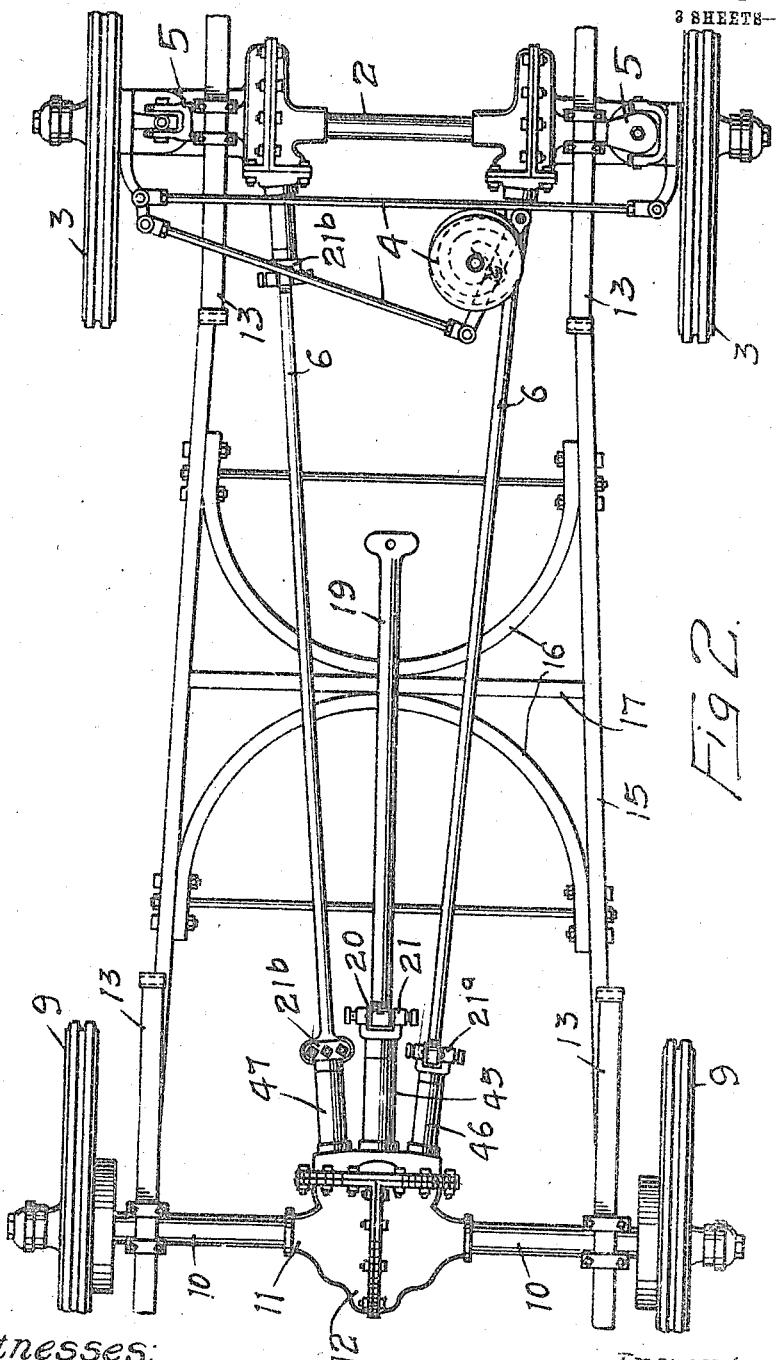

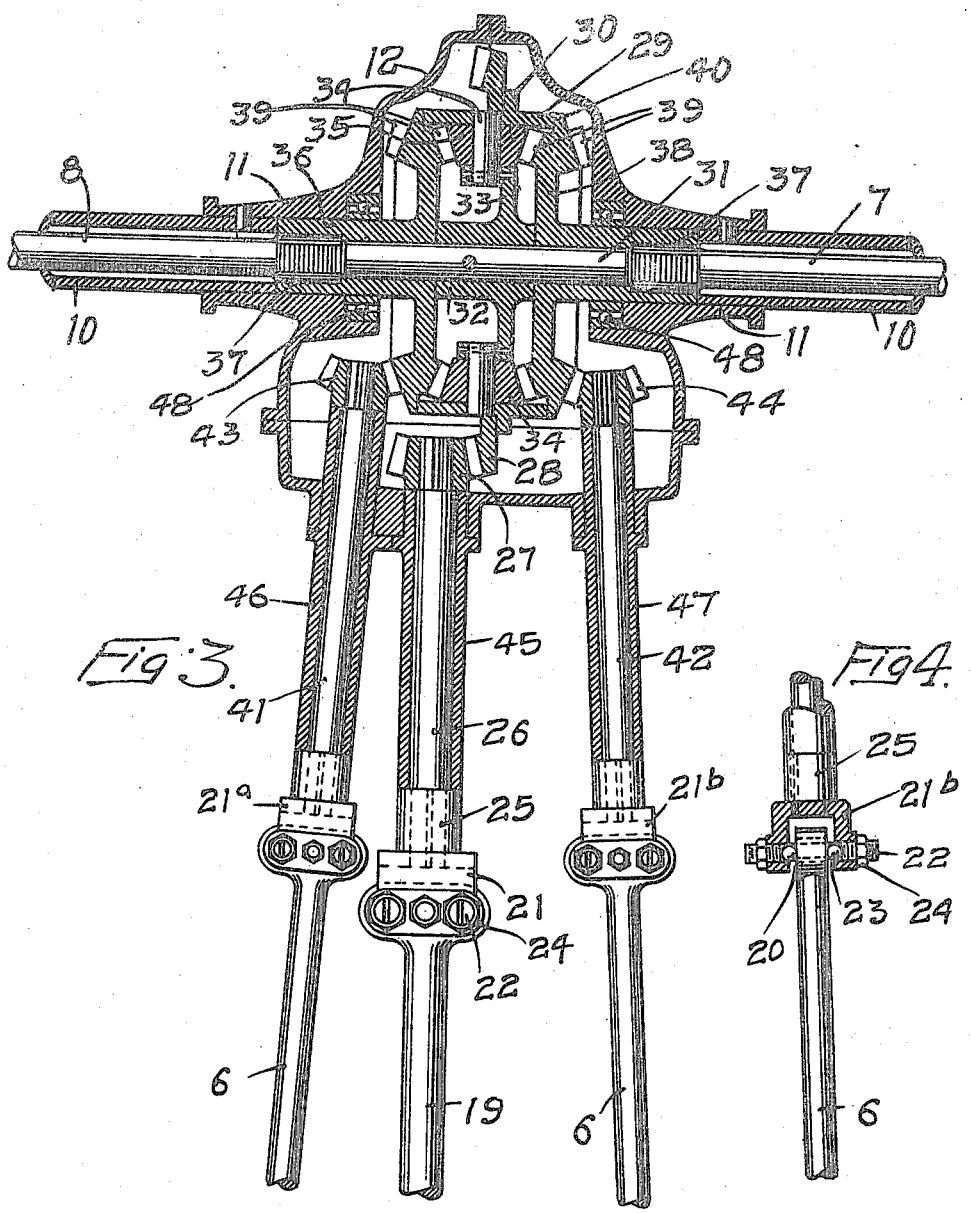

JOSEPH L. WARE, OF ST. PAUL, MINNESOTA.

FOUR-WHEEL DRIVE.

1,135,085.     Specification of Letters Patent.     Patented Apr. 13, 1915.

Application filed October 16, 1911. Serial No. 655,037.

*To all whom it may concern:*

Be it known that I, JOSEPH L. WARE, of St. Paul, Ramsey county, Minnesota, have invented certain new and useful Improvements in Four-Wheel Drives, of which the following is a specification.

The primary object of my invention is to provide a four-wheel driving mechanism embodying a single differential and a positive direct drive through the differential to the axle sections, thereby improving the construction and reducing the cost and maintenance of four-wheel drives as usually constructed.

A further object is to provide a driving mechanism which will relieve the transmission gearing from danger of breakage resulting from the sudden application of power to the driven shafts.

A further object is to provide means in connection with the differential gear effecting the even distribution of the strain, particularly in turning corners.

Other objects of the invention will appear from the following detailed description.

The invention consists generally in various constructions and combinations, all as hereinafter described and particularly pointed out in the claims.

In the accompanying drawings forming part of this specification, Figure 1 is a side elevation of a truck with my invention applied thereto, Fig. 2 is a plan view of the running gear of the truck, showing the application of the four-wheel drive thereto, Fig. 3 is a detail sectional view of the differential mechanism applied to the rear axle, Fig. 4 is a detail view showing the anti-friction bearing box between the forward and rear sections of a driven shaft.

In the drawings, 2 represents the forward axle, and 3 the forward wheels having a steering rigging 4 and driving connections 5 at each end of the axle 2 with secondary or driven shafts 6. This front wheel drive and steering mechanism forms the subject-matter of a companion application herewith and I make no claim to the same herein.

7 and 8 represent sections of the rear axle having carrying wheels 9. These sections are preferably inclosed by sleeves 10 which are pinned to boxes 11 of a housing 12. Similar sleeves are provided for the forward axle. Upon these sleeves suitable springs 13 are mounted, supporting the truck body 14, or in case the invention is applied to an automobile, springs of any preferred type may be employed to support the body of the car. The forward and rear axles are connected by reaches 15 between which suitable braces 16 and 17 are arranged. The engine 18 is preferably located at the forward ends of the reaches, near the forward axle. These reaches and the driven shafts 6 are sufficiently flexible so that if power is applied very suddenly to the driving mechanism the reaches will buckle upward slightly and the shafts will twist sufficiently to relieve the transmission mechanism of the extreme strain or shock resulting from a too sudden application of the power.

The source of motive power inclosed within the hood 18 may be a gas engine of the usual type connected with the forward end of a primary or driving shaft 19 through a gear box or otherwise. The rear end of this shaft, as well as the shaft 6, has a flattened portion 20 fitting into a box 21 having threaded sockets provided with set screws 22. The inner ends of these screws have seats for bearing balls 23 which contact with the flattened portion 20 of the shaft 6 and lock nuts 24 mounted on these screws permit their adjustment to take up the wear of the bearing to adjust the bearing balls in proper position with respect to the bearing surface of the shaft. These boxes and anti-friction bearings allow a slight longitudinal movement of the driven shaft to take up the lengthwise thrust and relieve the shafts and the connecting mechanism of the racking, twisting strain incidental to the running of the truck or car over rough pavements or roads. They also compensate for the twisting of the frame and running gear resulting from the turning of the car on uneven roads.

The box 21 has a hub 25 to receive the squared, forward end of a shaft 26. The rear end of this shaft projects into the housing 12 and carries a pinion 27 meshing with a beveled gear ring 28. This ring incloses a collar 29 having, preferably an annular rib 30 to which the ring 28 is secured. 31 is an axle section between the sections 7 and 8 and in line therewith and on this section a hub 32 is secured having an annular web 33 supporting a series of radiating pins 34 at intervals around its circumference. There are preferably four of these pins and a corresponding number of pinions 35 are loosely mounted on these pins and the outer ends of the pins are seated within sockets provided in the collar 29. Hubs 36 are loosely mounted on the axle sections 7 and 8 and have sockets 37 to receive the squared ends of said axle sections to transmit power thereto, and these hubs are provided with gears 38 having two sets of teeth 39, one on each face, the inner set of teeth of each gear meshing with the pinions 34 and forming therewith a differential gearing. The edges of the gears are provided with flanges 40 between which the collar 29 is inserted. The driven shafts 6 are arranged one on each side of the driving shaft and have boxes corresponding to the one described with reference to the primary shaft, which I will indicate by the same reference numeral with the addition of the exponents "a" and "b". The driven shafts also have shaft sections 41 and 42 projecting into the housing and provided with pinions 43 and 44 meshing respectively with the outer teeth of the gears 38. The shaft sections 26, 41 and 42 are inclosed within suitable sleeves 45, 46 and 47. The hubs of the gears 38 are journaled in the boxes 11 and are preferably provided with anti-friction bearings 48. When power is applied to the driving shaft it is evident that through the gear ring and collar 29 and the beveled gears 38 the power will be transmitted to the axle sections 7 and 8 and at the same time through the secondary or driven shafts power will be transmitted to the forward traction wheels, and then all four wheels of the vehicle will be driven simultaneously. The collar has a side thrust resulting from the application of power to the driving shaft thereto and operates to hold the beveled gears and pinions in driving connection, insuring the even distribution of the power of the four wheels even though the car may be running over a rough road or pavement where considerable lateral twist and endwise thrust will be thrown upon the driven shafts.

From the foregoing it will be noted that a single differential gearing is used and that an all-shaft drive is provided through and by means of this gearing to the sections of the forward and rear axles. A positive, direct drive is thus provided, the mechanism of a four-wheel drive as usually constructed is greatly simplified and reduced in cost of manufacture and maintenance, and provision is made for preventing breakage or damage of the parts and insuring a flexible driving mechanism while operating over rough roads or pavements or in turning the machine.

In various ways the details of construction herein shown may be modified and still be within the scope of my invention.

I claim as my invention:—

1. A four-wheel drive comprising forward and rear axle sections, a single differential gearing, and a shaft driving means operating directly through and by means of said gearing for driving all of said axle sections the sections of one axle being geared directly to said differential.

2. A four-wheel drive comprising forward and rear axle sections, a differential gearing interposed between the sections of one axle, driven shafts geared to said differential gearing and to the sections of the other axle, and a driving shaft geared to said differential gearing, power being applied to said driven shafts and axle sections directly through and by means of said differential.

3. A four-wheel drive comprising rear axle sections and means for driving the same, including a differential gearing, located between said rear axle sections and geared thereto, front axle sections, and shafts for driving the same, said shafts and said rear axle sections being directly driven by the said driving means through and by means of the said differential gearing.

4. A four-wheel drive comprising rear axle sections and means for driving the same, including a differential gearing, front axle sections, and shafts for driving the same, said shafts being directly driven by said driving means through and by means of the said differential gearing, and flexible and extensible bearings in said shafts.

5. A four-wheel drive comprising rear axle sections, a differential gearing having direct driving connections with said sections, said differential gearing including a pair of outer beveled gears, a driving shaft geared to said differential between said outer gears, front axle sections, and shafts directly geared to said beveled gears and to said front axle sections for driving the latter.

6. A four-wheel drive comprising rear axle sections, a gear ring concentric with said sections, a drive shaft geared to said gear ring, differential gearing connecting the gear ring with said axle sections, front axle sections, and shafts directly geared to said differential gearing and to the front axle sections for driving the latter.

7. A four wheel drive comprising front and rear axle sections and shafts for driving the former from the latter, each of said shafts being composed of sections having a universal joint between them, said joint consisting of an expanded flat-sided head and a correspondingly expanded, flat-sided fork straddling said head, means for connecting the head and fork, and ball bearings disposed between adjacent faces of said head and fork.

8. A four-wheel drive comprising front and rear axle sections and shafts for driving the former from the latter, each of said shafts being composed of sections having a universal joint between them, said joint consisting of an expanded flat-sided head and a correspondingly expanded, flat-sided fork straddling said head, means for connecting said head and fork, ball bearings disposed between adjacent faces of said head and fork, and means for independently adjusting each of said ball bearings.

9. A four-wheel drive comprising front and rear axle sections and shafts for driving the former from the latter, each of said shafts being composed of sections having a universal joint between them, said joint consisting of an expanded flat-sided head, a correspondingly-expanded, flat-sided fork straddling said head, means for connecting said head and said fork, ball bearings disposed between adjacent faces of the head and fork, and screw members threaded into the members of said fork, each of said screw members having a socket to receive one of said ball bearings.

10. A four-wheel drive comprising front and rear axle sections and shafts for driving the former from the latter, each of said shafts being composed of sections having a universal joint between them, said joint comprising an expanded flat-sided head and a correspondingly expanded, flat-sided fork straddling said head, a bolt extending through said fork and through an elongated opening provided in said head, and ball bearings disposed between adjacent faces of the head and fork.

11. A four-wheel drive comprising front and rear axle sections, and shafts for driving the former from the latter, each of said shafts being composed of sections having a universal joint between them, said joint consisting of an expanded flat-sided head, a correspondingly expanded, flat-sided fork straddling said head, a bolt extending through said fork and through an elongated opening provided in said head, ball bearings disposed between adjacent faces of said head and fork, a portion of said ball bearings being on each side of said bolt, and means for holding all of said bearings in a plane passing through the axis of said bolt.

12. A four-wheel drive comprising front and rear axle sections and shafts for driving the former from the latter, each of said shafts being composed of sections, one section of a shaft having a forked end adapted to receive the flattened adjacent end of the other section, and an anti-friction bearing interposed between the arms of the forked section and the flattened surfaces of the adjacent section.

13. A four-wheel drive for self-propelled vehicles, comprising rear axle sections, a differential gear comprising outer gear members operatively connected respectively with said axle sections, an intermediate member having loose pinions meshing with the teeth of said outer gear members, a gear ring inclosing said intermediate member and connected therewith, a driving shaft geared at one end to said gear ring and having a driving connection with a source of power and driven shafts geared respectively to said outer gear members and forward axle sections having driving connections with said drive shafts.

14. A four-wheel drive comprising rear axle sections, a differential transmission gear comprising outer gear members operatively connected respectively with said axle sections, an intermediate member having a plurality of pinions loosely mounted thereon and meshing with said outer gear members, a collar inclosing said intermediate member and having bearings on said outer gear members and provided with a peripheral gear, a shaft having a pinion meshing with said collar gear and operatively connected with a source of power, driven shafts geared to said outer gear members respectively, forward axle sections, and driving connections between said forward axle sections and said driven shafts.

15. The combination, with the rear axle sections having carrying wheels, of a differential gear having outer members operatively connected with said sections respectively, an intermediate member meshing with said outer members, a driving shaft geared to said intermediate member, sectional driven shafts geared to said outer members respectively, means interposed between the sections of said driven shafts to compensate for end thrust and lateral twist thereon, forward axle sections, and driving connections between said driven shafts and said forward axle sections.

16. A two-part axle, a differential gear comprising outer gear members operatively connected with said axle sections, an intermediate member having loose pinions meshing with the teeth of said outer gear members, a gear ring inclosing said intermediate member and connected therewith, a driving shaft geared at one end to said gear ring and having a driving connection with a source of power, and driven shafts geared respectively to said outer gear members.

17. A four-wheel drive comprising forward and rear axle sections, a differential gearing disposed between the rear axle sections, a driving shaft for said gearing, driven shafts for driving said forward axle sections from said gearing, reach bars connecting the corresponding forward and rear sections, said reach bars and said driven shafts being flexible, for the purpose specified.

18. A four-wheel drive comprising rear axle sections, an intermediate axle section, a differential hub secured on said intermediate section, a series of pinions carried by said hub, miter gears having inner and outer toothed faces loosely mounted on said intermediate section and having driving connections with said axle sections, the teeth of the inner faces of said miter gears meshing with said pinions, driven shafts geared to the teeth of the outer faces of said miter gears, front axle sections having driving connections with said driven shafts, and a driving shaft having a driving connection with said differential hub.

In witness whereof, I have hereunto set my hand this 10″ day of October 1911.

JOSEPH L. WARE.

Witnesses:
  GENEVIEVE E. SORENSEN,
  EDWARD A. PAUL.